United States Patent [19]

Jakob

[11] Patent Number: 5,669,114
[45] Date of Patent: Sep. 23, 1997

[54] CONVEYOR BELT JOINTING DEVICE

[75] Inventor: Horst Jakob, Deaux, France

[73] Assignee: Aser, Saint-Chamond, France

[21] Appl. No.: 617,783

[22] PCT Filed: Jul. 28, 1994

[86] PCT No.: PCT/FR94/00960

§ 371 Date: Mar. 20, 1996

§ 102(e) Date: Mar. 20, 1996

[87] PCT Pub. No.: WO96/03597

PCT Pub. Date: Feb. 8, 1996

[51] Int. Cl.$^6$ .................................................. F16G 3/04
[52] U.S. Cl. ................................... 24/33 P; 198/844.2
[58] Field of Search ............................ 24/33 P, 33 B, 24/33 R, 31 B, 33 M, 33 C; 198/844.2, 850, 853; 474/257, 253

[56] References Cited

U.S. PATENT DOCUMENTS

| | | | |
|---|---|---|---|
| 3,737,954 | 6/1973 | Tabler | 198/844.2 X |
| 4,060,877 | 12/1977 | Schick | 24/33 B |
| 4,611,367 | 9/1986 | Meulenberg et al. | 24/33 P |
| 4,671,403 | 6/1987 | Schick | 24/33 P X |
| 4,858,280 | 8/1989 | Schick | 24/33 P X |
| 5,097,944 | 3/1992 | Schick | 198/844.2 |
| 5,182,933 | 2/1993 | Schick | 72/335 |
| 5,234,101 | 8/1993 | Herold | 198/844.2 |
| 5,236,079 | 8/1993 | Herold | 198/844.2 |
| 5,327,823 | 7/1994 | Clevenger, Jr. et al. | 24/33 P X |
| 5,341,545 | 8/1994 | Herold | 24/33 P |
| 5,415,913 | 5/1995 | Clevenger, Jr. | 24/33 P X |
| 5,542,527 | 8/1996 | Jakob | 198/844.2 |

FOREIGN PATENT DOCUMENTS

| | | | |
|---|---|---|---|
| 0 477 469 | 4/1992 | European Pat. Off. | |
| 1 313 652 | 12/1962 | France . | |
| 2 022 930 | 8/1970 | France . | |
| 2 701 300 | 8/1994 | France . | |
| 19 52 528 | 5/1971 | Germany . | |
| 27 08 489 | 9/1977 | Germany . | |
| 3843872 | 6/1990 | Germany | 198/844.2 |
| 1251564 | 10/1971 | United Kingdom . | |

*Primary Examiner*—Peter M. Cuomo
*Assistant Examiner*—Robert J. Sandy
*Attorney, Agent, or Firm*—Browdy and Neimark

[57] ABSTRACT

The joining device is constituted by U-shaped staples fixed to the ends of the conveyor belt. The staples (1) comprise in their concave part a ring (3) of a wear resisting material the wear being due to the friction, and which has also good slipping properties. A tightness stripe (8) links the rings (3) and therefore the staples (1). The tightness stripe (8) comprises blades (9) which form a double tightness barrier in the gaps which are present between the front part (14) of the conveyor belt (13) and the front convex part of the opposed staple. The staples (1) are connected by means of a linking and hinging rod (15) threaded across the rings (3) of the successive staples (1) belonging alternately to one and to the other staple row. When mounted the rings (3) are in abutment against the front part (14) of the conveyor (13).

29 Claims, 7 Drawing Sheets

CONVEYOR BELT JOINTING DEVICE

BACKGROUND OF THE INVENTION

PRIOR ART

Conveyor belts are used in mines quarries and various industries. They comprise known junctions, obtained by joining the two ends of the conveyor belt, for instance by vulcanization, or by fitting the edge of each one of the belt edges with a row of staples, generally U-shaped, arranged side by side. The curved part of these staples projection outwardly beyond the edge of the belt on which the staples are placed, the dimension of this projecting part being, in the transversal direction of the conveyor, approximately equal to half of the dimension of the two lugs of the staple located respectively on the upper side and on the lower side of the end of the conveyor belt. Gaps are thus formed, in the transversal direction of the conveyor belt, between the curved projecting parts, although the staple lugs are positioned side by side.

These gaps are provided for receiving the projecting portions of the projecting curved parts of the staples belonging to the staple row fixed on the other end of the conveyor belt, when the ends are brought close to each other in order to carry out the junction.

The fixing of the staples on the end of the conveyor belt is carried out in a known way by means of simple or dual nails or points which are passed from one of the sides of the conveyor belt through holes purposedly drilled in one of the lugs of each staple, then by stitching through the conveyor belt. Last holes are drilled in the other lug of each staple, in alignment with the corresponding through hole of the other lug, and the projecting part of the point being is folded down in longitudinal grooves provided on the lug from which it projects. This arrangement is used in order to avoid an overthickness above the level of the external surface of the lug.

The concave parts of the lugs of both rows of lugs form a series of eyelets interleaved side by side. A connecting and hinging rod can be passed through, the exclets from one of the sides of the conveyor belt.

Once the connecting and hinging rod is passed through, the assembly thus obtained acts like a flexible hinge linking the two ends of the conveyor belt, which are thus articulated.

The belt can then be submitted to the suitable mechanical tension of operation, for instance by moving the idle pullers away from each other. When submitted to this mechanical tension, only the front concave parts of the staples bear upon the linking and hinging rod, over approximately 180°. These concave parts have a half-circle shape, in order to bear uniformly against the linking and hinging rod having a round cross-section.

In course of operation the staples are submitted to various stresses. The most obvious stress is that corresponding to the wear of the front concave parts of the staples which is caused by the friction against the linking and hinging link against which they bear.

This stress is most often amplified by the presence of abrasive particles rejected by the material carried on the conveyor belt (coal, minerals, sand). Since the assembly formed by the staples leave gaps therebetween, mainly between the front convex part of the staples and the opposed edge of the conveyor belt, these particles pass through these gaps and are spread under the conveyor.

The other stress concerns the tension exerted on the staple lugs, this tension being transmitted to the fixing points and through these to the conveyor belt, thus tending to tear the latter. This tension may lead to a shifting of at least certain of these lugs with respect to the end of the conveyor belt, in its longitudinal direction. This shifting may be unequaly distributed between the displaced lugs, some of them moving more than the others. A misalignment of the eyelets may result, and therefore a certain concave parts of the staples bear against the linking and hinging line with a smaller force for certain staples, and even with no force at all. This reversely increases the force borne by the staples which have been slighty moved. It is easily inderstood that this situation is detrimental to the service life of the junction.

Another problem caused by the use of conventional staples, consists in the lack of tightness of the junction. Although an absolute tightness cannot be reached, it is desirable to limit to the maximum the leak of the material particles carried by the gaps existing between the staples and the conveyor belt, since the accumulation of these particles, which as mentioned hereabove, participate in wear of the junction. It also has serious consequences on the conveyor belt itself, the internal face of which transfers the particles on the idle rollers which are clogged and thus become a cause of wear of the conveyor belt. Another still more serious consequence due to this leaking of particles of the carried material from one side of the junction to the other, and therefrom on the internal part of the conveyor belt as well as on the rollers, occurs in the case of dust coal, with a risk of fire due to the friction between the conveyor belt and the roller surface and therefore a risk of pit gas in the case where this dangerous gas is present.

Solutions have been proposed for some of these problems. For instance, in what concerns the wear due to the friction of the staple concave parts over the linking and hinging rod, Patent DE-A-1 952 528 proposed the thickening locally of the metal side in which the staples are cut, by flowing of the metal between these thickened parts, this operation contributing also to the cold rolling of the metal thus increasing its mechanical resistance to wear. Patent DE-A-2 708 489 proposes the folding in a U or V-shape the metal in which the staples are cut, in such a way as the width of the profile of the curved parts of the staples, should be equal to half of that of the staple fixation lugs. A thin U or V-profile, open either inwardly or outwardly is supposed to be more resistant to wear than the concave parts of conventional lugs.

In what concerns the problem related to the relative tightness of the junction, it has been proposed heretofore, on account of the state of the art, solutions based on the use of solid filling bodies made up of elastic materials such as rubber foam or synthetic resin foam, for instance polyurethane resin foam, which are supposed to ensure a durable tightness to the junction. However these solutions are limited since the running stresses are such that these solid bodies are quickly damaged. Furthermore these materials tend to flow towards the empty spaces of the eyelets at the time of fixing the staples on the conveyor belt, thus preventing the free passage of the linking and hinging rod when this latter is threaded across. In the following description, and for sake of clearness, the rear part of the staples is the one comprising the fixation lugs, whereas the front part of the staples is the curved one, externally convex and internally concave. More generally the rear part will be the direction corresponding to the rear part of the staples, such as it has been just defined and the front part the direction corresponding to the front part of the staples such as it has been just defined. The upper and lower parts are considered in relation with the upper part of the conveyor belt, i.e. the one receiving the material to be carried.

OBJECT AND SUMMARY OF THE INVENTION

An object of the present invention is a joining device for conveyor belt comprising two rows of generally U-shaped staples, fixed on the edge of each one of the edges of a conveyor belt by means of simple or dual points nails. The curved part of the U-shaped staples, projecting beyond the edges form the ends of the conveyor belt. The concave parts of the U-shaped staples form a series of eyelets bounded by the said concave parts of the staples and by the edge of the end of the conveyor belt to which the staples are fixed. The staples of each one of the rows are located between the staples of the other row, in such a way as the eyelets of the staples of both rows are in alignment in the transversal direction of the belt. A linking and hinging rod is threaded across these aligned eyelets. These joining device does not present the inconveniences, described hereabove, specific to the known devices, regarding the wear of the staples and more generally the service life of the junctions. Another object of the invention, is aimed to improve the tightness of the joining device, with respect to the leakage of the material particles carried by the conveyor belt and to constitute an abutment for a correct positioning of the staples during their fitting on the conveyor belt.

According to the invention, the problem is solved thanks to a ring fixed to the concave part of each one of the U-shaped staples. The linking and hinging rod is threaded across the successive rings, belonging alternately to the one and to the other staple rows. Generally, the ring does not have ring shape. Effectively, as it will appear further on, a certain gap should be available for threading across the linking and hinging rod, and a perfect alignment required by a round shaped ring is hardly compatible with the running conditions.

Advantageously, the ring is oval shaped or has a "racecourse" shape, i.e. it has a peripherial half-circle shaped part, on the side where it is received in the concave portion of the staples, a similar part on the opposite portion, i.e. on the side directed towards the edge of the conveyor belt when the staple is fixed to this latter, and between these two half-circle shaped parts, two sections linking respectively the ends of the half-circle shaped parts, these sections forming straight lines or slightly concave curved lines.

The profile of the concave part of the staples is complementary to that of the external periphery of the ring.

The external periphery of the ring may be formed according to several shapes, enabling a firm seating of the ring in the concave part of the staple. Several alternative solutions are proposed for the preferred embodiments described hereafter.

The ring is not necessarily closed; it could be a broken ring or even a broken ring with overlapping ends, as it will appear from the description of a preferred embodiment. These overlapping ends are used for fixing a tightness element, the ring part bearing, in course of operation, against the linking and hinging rod, forming a half-circle, as in the case of a closed ring or of a broken ring, the rear most end advantageously abutting against the front part of the end of the conveyor belt. The rings may also be constituted by a chain of uncompletely closed rings connected to each other by linking parts skewed with respect to the median plane of the ring chain passing through the largest internal dimension of the rings, according to a helical shape, the step of which is nil at the level of each uncompleted closed ring, the linking skewed part enabling to reach forwardly the next uncompletely closed ring, margin between successive rings corresponds to the margin left for the setting of the staples on the conveyor belt, or the rings may form a chain of uncompleted closed rings connected together by linking parts generally parallel to the median plane of the ring chain which passes through the largest dimension of the rings, thus forming a sort of winding. The coiling direction of the incompletely closed rings are reversed for each ring of the ring chain with respect to the coiling direction of the preceding ring. The connecting parts generally parallel to the longitudinal median plane of the ring chain, are alternately located closer to the ring center, then farther to this latter, the part connecting one of the ring ends to the connecting part generally parallel to the longitudinal median plane, and the part connecting the other end of the said ring to the other linking part generally parallel to the longitudinal median plane, overlapping on a certain distance and being very close to each other.

The fixing of the rings in the concave curved parts of the staples may be carried out according to various methods. In the case where the ring is received in a concave part of the staple presenting two raised edges oriented towards the internal part of the concavity, the ring may be pinched between these two raised edges. In the case where the concave part of the staple does not present these two raised edges, oriented towards the internal part of the concavity, the ring may be attached by welding in the staple concavity. Effectively such a welding can be carried out as an additional operation, in the case where the ring is already fixed by pinching between two raised edges of the staple concave part. Last, the staple concave part may extend over an angle exceeding 180°, the ring presenting a complementary male shape enabling an interlocking of the ring in the said concavity, the said interlocking being strengthened during the final attachment of the staple on the conveyor belt.

According to the invention, the rings are advantageously in a material substantially more resistant to wear caused by friction, than the material constituting the staples. This enables the improvement of the service life and the efficiency of the junctions, while leading to considerable material saving since a less noble material can be chosen for the staples.

To ensure the tightness of the junction, in particular in what concerns the gap between the convex part of the staples and the edge of the opposed end of the conveyor belt, according to the invention, a tightness stripe is provided fixed to the parts of the rings located at the opposite side of the concave part of the staples belonging to one same row, designated further on as the rear part of the rings. This tightness stripe is also used for handling the staples and their presentation with a suitable spacing in view of their attachment on the conveyor belt. The tightness stripes according to the invention comprise an elongated part in a certain material, preferably flat and resilient, such as a metallic sheet or a plastic material sheet. The sheet is cut and formed in the first case, and thermoset and cut in the second case, and its profile corresponds generally to the curvature of the rear part of the ring on which it has to be fixed. According to the mode of attachment the elongated part of the tightness band may comprise or not steps enabling this attachment, these steps being necessary for instance, in the case where the rings are of the broken type with overlapping ends, or of the winding type as described hereabove.

Thin tightness blades are solidly attached to this elongated part, forming a single unit with it, the surface and the spacing of these blades corresponding respectively to the surface and the spacing of the upper parts and of the lower parts of the gaps existing between the staple convex part of a given row and the opposed end of the conveyor belt and between the staples of the other row fixed to the said opposed end when the junction is completed.

These blades may be arranged on one single row. In this case they are located on the side of the tightness stripe, which once mounted, is oriented towards the external part of the conveyor belt. Preferably in order to reach an improved efficiency, they are arranged according to two symmetrical rows with respect to the longitudinal symmetry plane which divides the elongated part of the tightness stripe. Furthermore, this symmetry prevents errors, during the setting of the staples on the conveyor belt.

Once the junction is completed, the external surface of the tightness blades is flush with the external surface of the narrow parts of the staples projecting beyond the end of the conveyor belt, and with the convex part of the staple belonging to the opposite row corresponding to each blade. The elongated part of the tightness stripe seats against the front part of the end of the conveyor belt.

The gaps are thus covered at one of their ends, when one single row of blades is provided, forming one single unit with the elongated part of the tightness stripe and at each one of their ends when, in view of a better result, two rows of blades are preferably provided, which are symmetrical with respect to the horizontal plane of symmetry dividing the elongated part of the tightness stripe. Thus, when fitted, the blades form a double tightness barrier covering the gaps described hereabove, at their upper end as well as at their lower end.

Additional tightness means will appear in the detailed description of preferred embodiment of the invention.

In what concerns the way of fixing the tightness stripes, several possibilities are envisaged according to the invention. In its simplest form, the tightness stripe is spot welded against tile internal face of the rear part of the rings. This way of implementation entails two requirements. On the one hand the upper row blades and the lower row blades have to be compressed momentarily, directed respectively one against the other, to enable the passage of the tightness stripe inside the ring. Owing to the resilience of the chosen material (metal or plastic material) the blades once released, return to their initial position and the welding can be carried out. On the other hand, owing to the retracted position inside the rings of the elongated part of the Lightness stripe, the blades are to be shaped in such a way as, thanks to a boss part, which is oriented, once fitted, towards the front part of the end of the conveyor belt, the blades ensure by themselves the tightness on the side of the said front part of the conveyor belt. The tightness stripes may be fixed also to the rear part of the rings, being inserted and tightened between the overlapping parts of the broken rings or to those of the connected rings of the winding type. This way of attachment may be completed by spot welding.

In the case of rings of the helical type, fixing can be carried out by welding the elongated part of the tightness stripe against the rear face of the connecting skewed part linking the successive rings, flush with the pairs of upper and lower blades.

In what concerns the problem related to the slipping of the staple lugs it has been observed that, according to the state of the art, since the lugs are strongly tightened against the conveyor belt at the time of their attachment by means of simple or double points, a certain depression takes place, accompanied by a certain flow of the constituent material of the conveyor belts. In particular, to the grooves formed on the external side of the staple lugs, and which are provided for receiving in one of the lugs the point heads, and in the other one of the lugs the folded down ends of the points, correspond on the internal side of the lugs, ribs of same shape. These ribs are pressed into the constituent material of the conveyor belt and participate in a certain measure to a better performance of the staple on the conveyor belt. However these ribs, which are formed by the grooves formed on the other side, arid where the folded down ends of the points are to be located, are arranged at the present state of the art, longitudinally with respect to the conveyor belt. This arrangement in the longitudinal direction, is not an optimum solution for hooking the staples to the conveyor belts.

It is the reason why the invention makes provision to this end and thus for a better resistance to wear of the junctions, leading to a longer service life of these latter, for the extension of the grooves and of the corresponding ribs, on the lug which receives the heads of the simple or double points, by means of grooves and corresponding ribs, forming in a plan view, angles with the base grooves and crossing therebetween. These ribs arranged in a non longitudinal direction ensure a better trimming of the corresponding lug and therefore of the staple.

Also, it has to be noted that the rings have an additional function, which consists in the fact that during the setting of the staples, straddling over the end of the conveyor belt, the rings move in abutment against the front part of the said end, thus facilitating the correct positioning of the staples. In the case where the elongated portion of the tightness stripe is welded to the rear part of the rings, this elongated portion itself moves in abutment against the front part of the end of the conveyor belt.

BRIEF DESCRIPTION OF THE DRAWINGS

A more detailed description of the invention, in relation with preferred embodiments is given in association with the drawings in which.

DETAILED DESCRIPTION OF THE PREFERRED EMBODIMENT(S) OF THE INVENTION

Figure 1:
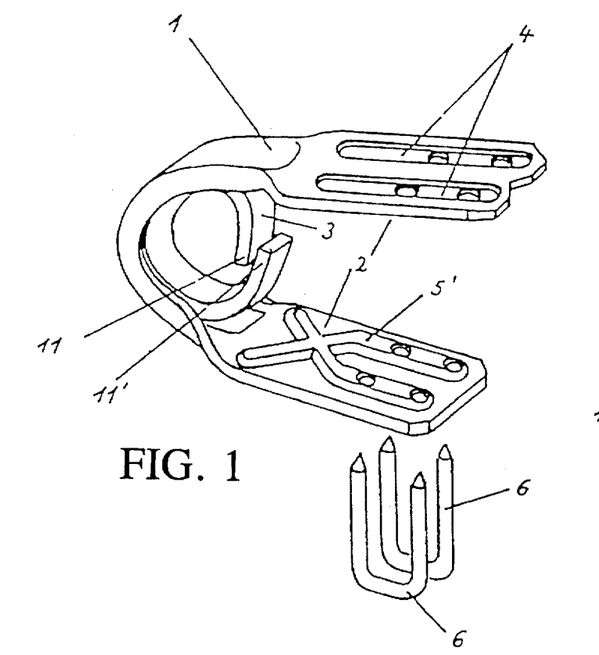
FIG. 1 is a perspective view of a staple according to a first embodiment of the invention, with the two double points for its fitting on a conveyor belt.

On FIG. 1, the staple 1 comprises fixing lugs 2, the front concave curved portion receiving a broken ring 3 with overlapping ends 11, 11'. The fixing lugs are provided on their external faces with longitudinal grooves, 4 and respectively 5 (not shown), to which correspond on the opposite faces longitudinal ribs 4' (not shown) and 5'. Double points of nails 6, 6 are provided for the further fixing of the staples, by crossing the holes formed in the grooves 4 and 5 and the ribs 4' and 5'.

Figure 2:
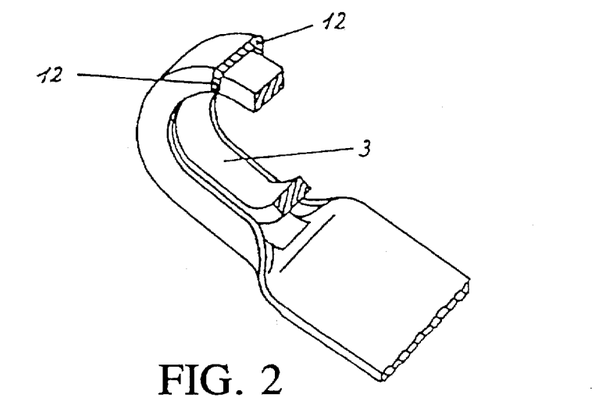
FIG. 2 is another perspective partial view, with partial cross-section, of the same staple as the one of FIG. 1.

FIG. 2 shows the way the ring 3 is pinched by the rims 12, 12 oriented towards the concavity of the curved part of the staple 1.

Figure 3:
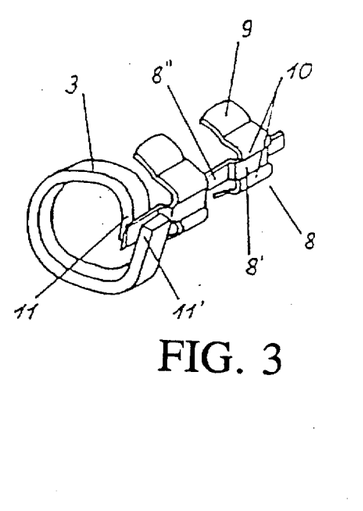
FIG. 3 is a perspective partial view of a portion of a tightness stripe fitted on a broken ring, identical to the one of FIG. 1.

FIG. 3 shows the fixing of a tightness stripe 8, partially represented. The tightness stripe comprises an elongated portion 8' provided with steps 8" and tightness blades 9 connected to the elongated portion 8' by parts 10 and 10 having rearward bosses. As shown on FIG. 3, the step 8" is pinched between the overlapping ends 11, 11' of a ring 3.

Figure 4:
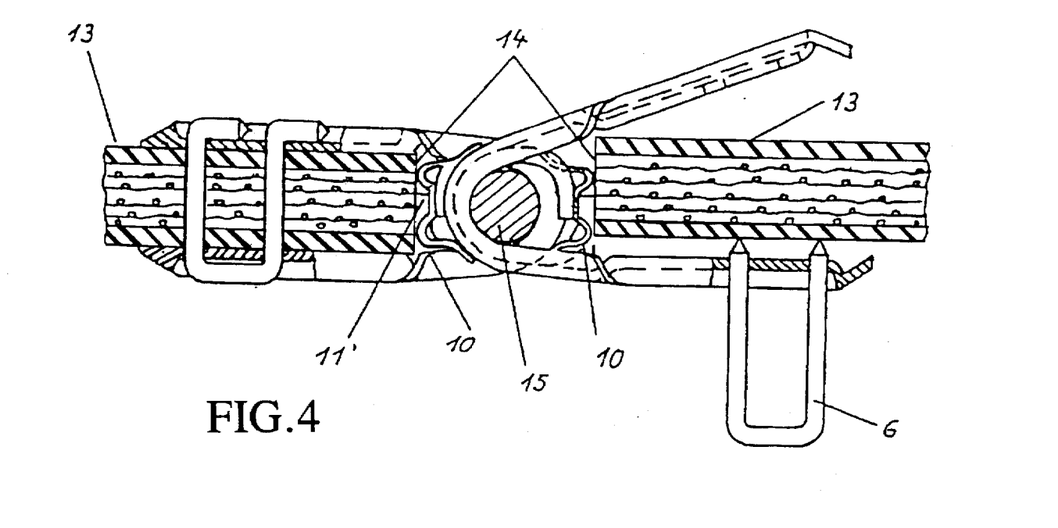
FIG. 4 is a longitudinal cross-section view of two staples according to FIG. 1, one of them on the left hand side of the Figure is fixed o one end of the conveyor belt, the other one, at the right hand side of the Figure, being merely represented.

A staple 1 is shown on the left hand side of FIG. 4, which is fixed to the end of a conveyor belt. It will be noted that the end 11' of the ring is in abutment against the front part 14 of the end of the conveyor belt 13. The parts 10, 10 of the tightness stripe provided with bosses are also in contact with the front part of the end of the conveyor belt 13. A linking and hinging rod 15 is threaded across the rings. On the left hand side of the Figure, the other staple is shown in a position yet unset. A double point of a nail 6 is threaded across the holes of the lower lug of the staple, while the upper lug of the staple is not yet folded down.

Figure 5:
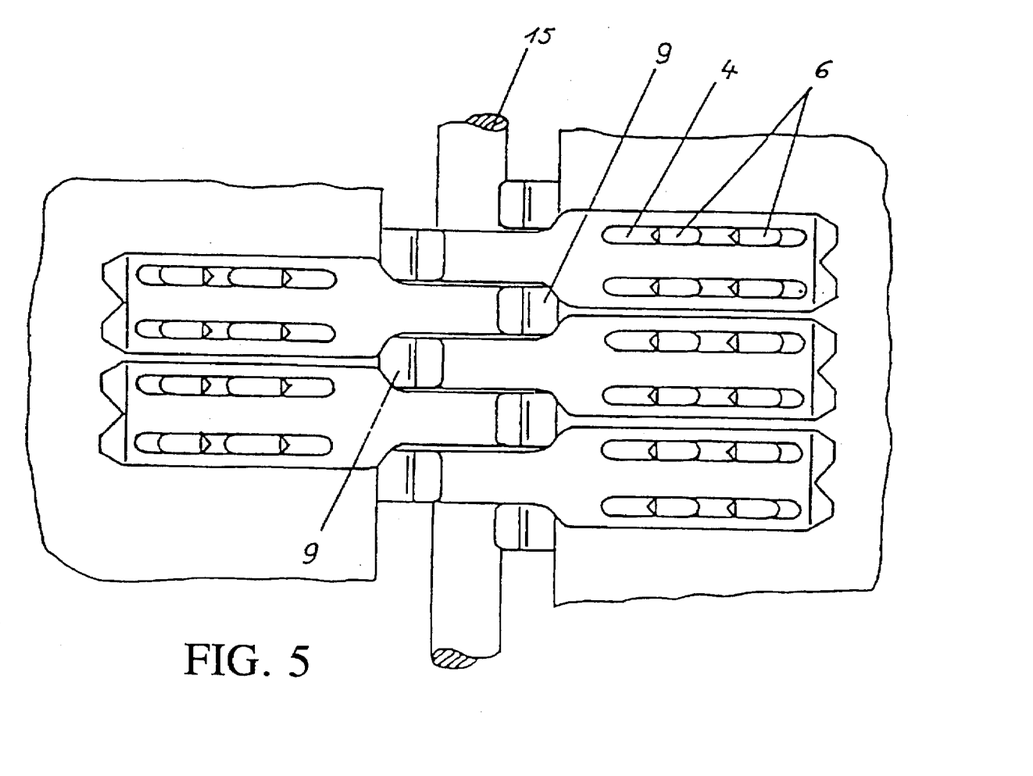
FIG. 5 is a top plan view of a junction identical to that of FIG. 4, the staples being fixed to the conveyor belt.

FIG. 5 is a top plan view of two staples located on the left hand side and three staples located on the right hand side linked by means of the linking and hinging rod 15. The blades 9 are in abutment against the front end of the conveyor belt and joining the curved part of the adjacent staple. The ends of the double points 6 being folded down in the grooves 4.

Figure 6:
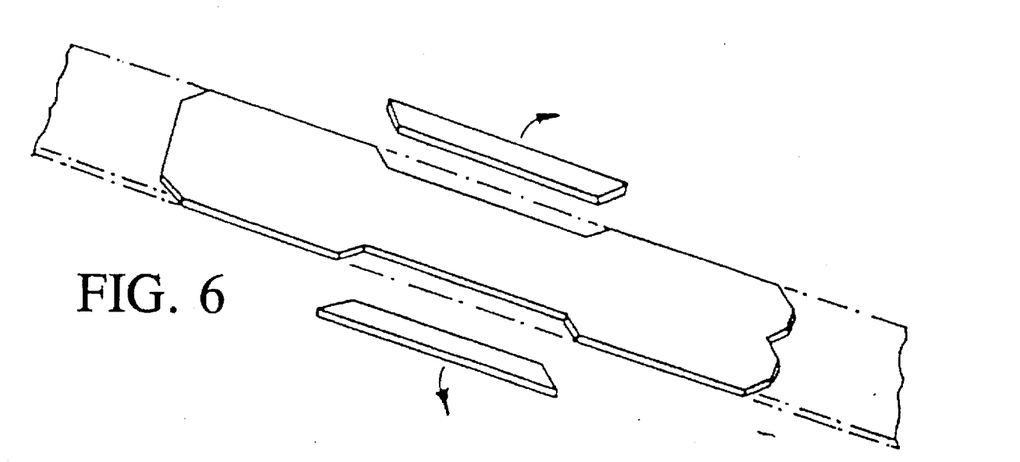
FIGS. 6 and 7 are schematic views of the manufacturing steps of the staple shown on FIG. 1.
Figure 7:
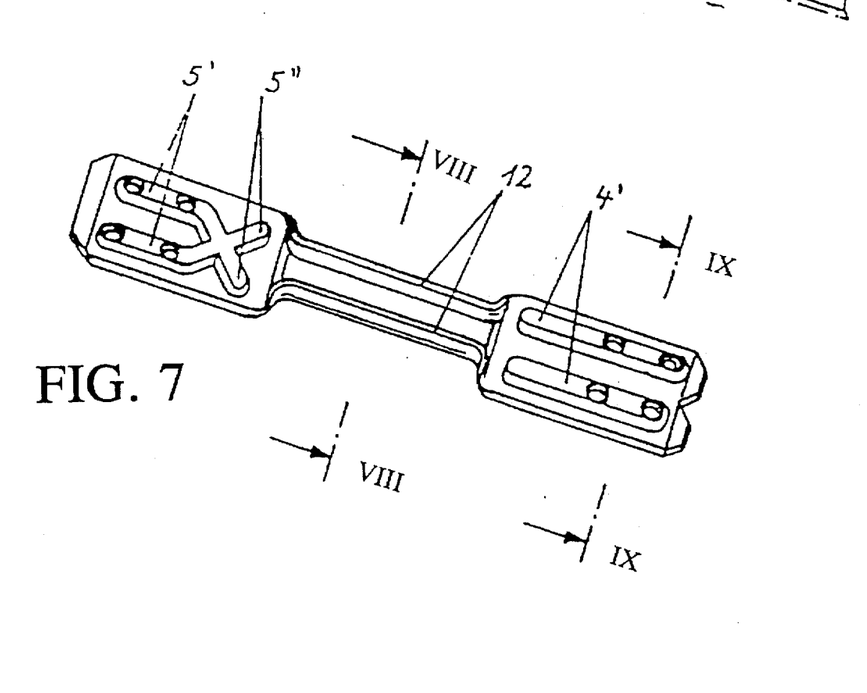

FIG. 6 shows the staple cut in a flat metallic sheet and FIG. 7 shows the staple still in a flat position on which the ribs 4' and 5' have been formed, the holes have been cut away and the rims 12 have been uplifted. In a further step, not shown, the staple is curved in U-shape.

Figure 8:
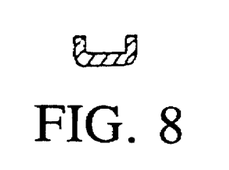
FIGS. 8 and 9 are transversal cross-sections of the staple shown on FIG. 1, respectively along the cross-section planes A—A and B—B of FIG. 7.
Figure 9:
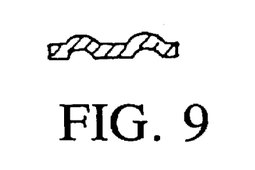

FIG. 8 shows the transversal cross-section of the narrow part of the staple according to the cross plane A—A of FIG. 7, FIG. 9 showing a transversal cross-section of the right hand lug of FIG. 7, according to the cross-section plane B—B of FIG. 7.

Figure 10:
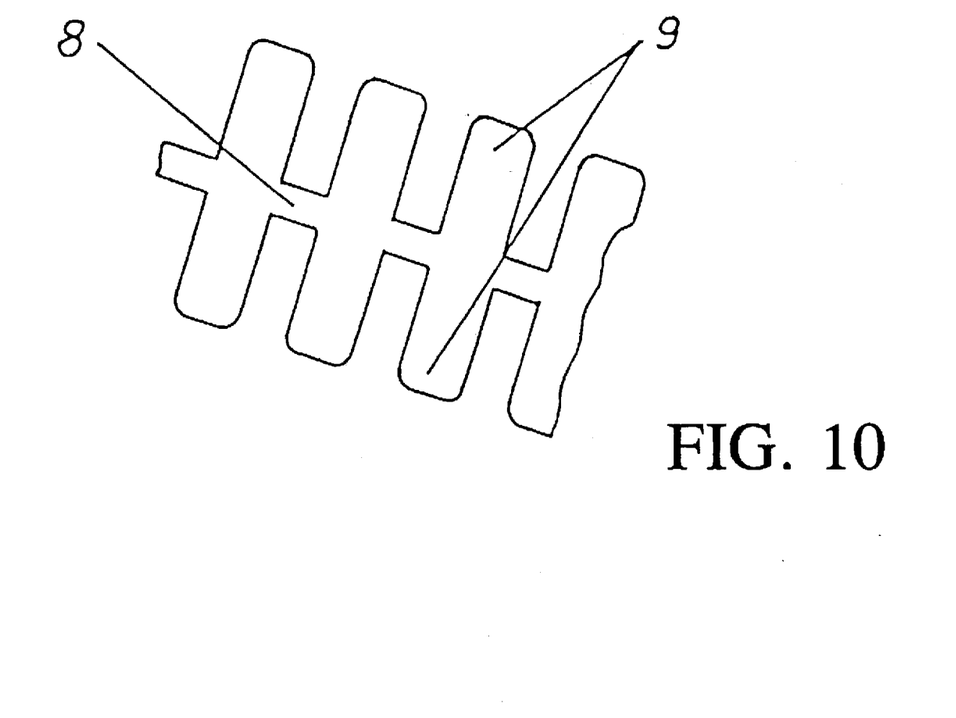
FIG. 10 is a plan view of an initial step of manufacturing of the tightness stripes.

FIG. 10 shows the initial stage of manufacturing of the tightness stripes by cutting a resilient metal stripe. The future blades 9 and the elongated part 8 can be observed.

Figure 11:
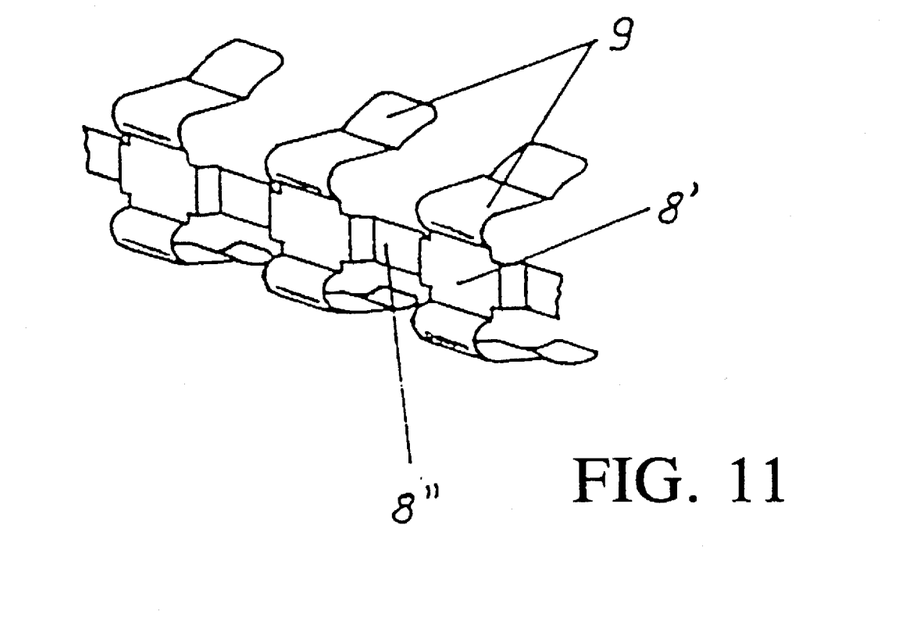
FIG. 11 is a perspective view of another embodiment of the staple according to the invention.

On FIG. 11, the blades 9 have been definitely formed and the elongated part 8' has been distorted between the successive blades to obtain the steps 8".

Figure 12:
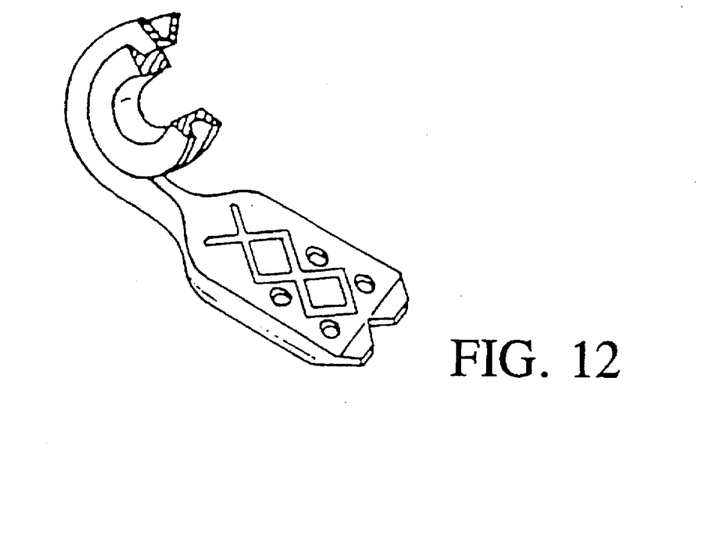
FIG. 12 is a perspective view of another embodiment of the staple according to the invention.

It can be observed from FIG. 12, thanks to the cross-section part, that another embodiment of the staple has in its narrow part a V-shape profile received in a slot of complementary shape formed in the external periphery of the ring.

Figure 13:
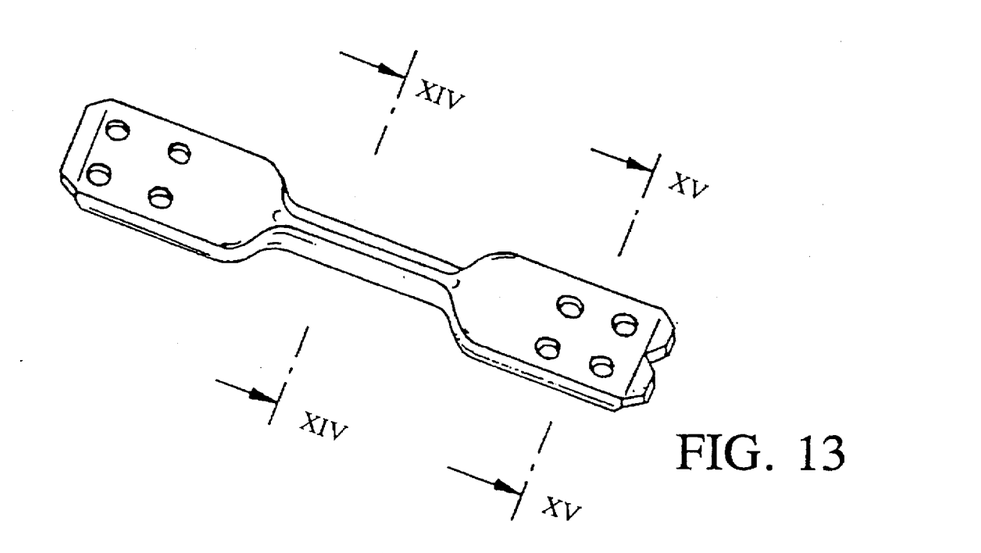
FIG. 13 represents a manufacturing step of the staples shown on FIG. 12.

FIG. 13 shows the same staple as the one shown on FIG. 12, at an intermediate manufacturing step.

Figure 14:
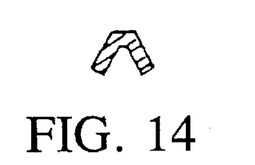
FIGS. 14 and 15 are respectively cross-sections of the staple along the cross-section planes C and D of FIG. 13.
Figure 15:
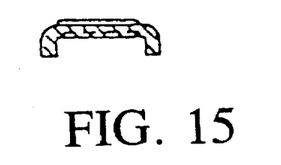

FIGS. 14 and 15 show respectively the transversal cross-section along the cross-section plane C—C of FIG. 13 and the transversal cross-section along the cross plane D—D of FIG. 13. The V-profile of the narrow part of the staple, is to be observed with the grooves and ribs not yet formed.

Figure 16:
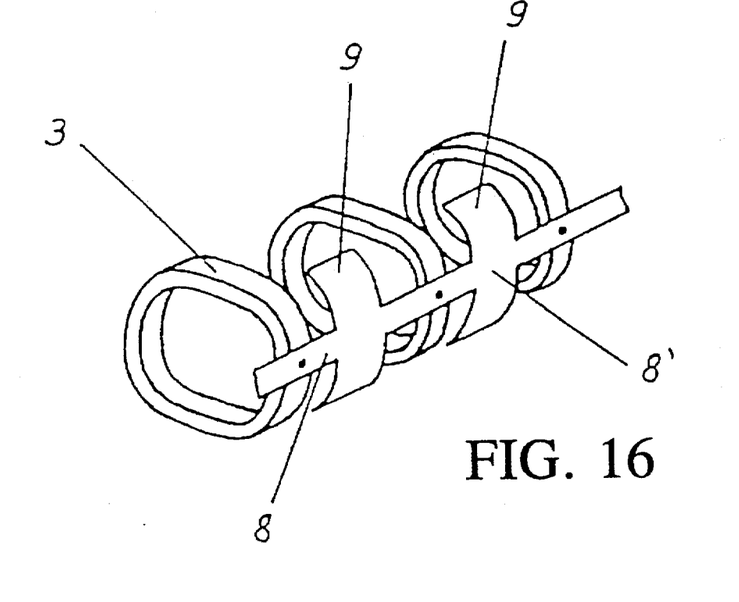
FIG. 16 is a perspective view of another embodiment of the rings and the tightness stripe.

FIG. 6 shows a particular embodiment of the invention in which the tightness stripe 8 where steps 8" are not provided and where bosses are not formed on the rear side of the blades 9 in the area where these latter are connected to the elongated part 8'. This is due to the way of fixing by welding, on the rear parts of the rings 3, which are of the closed type in the embodiment considered. In this case, the elongated part 8' of the tightness stripe 8 abuts over its whole length against the front part 14 of the end of the conveyor belt.

Figure 17:
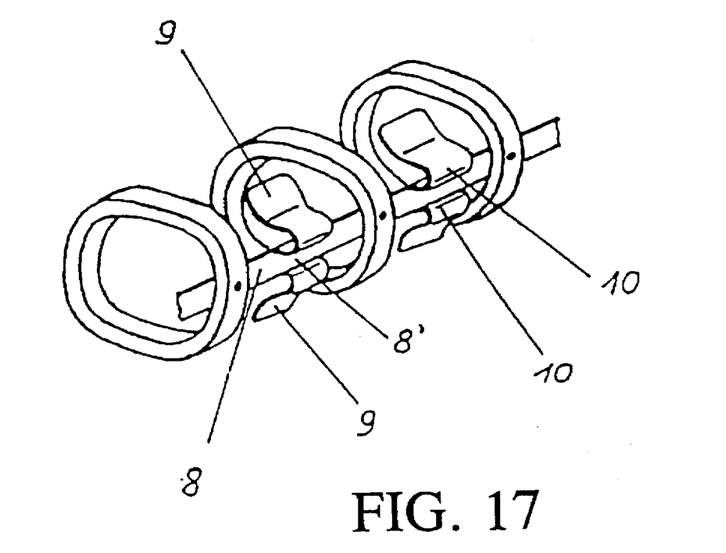
FIG. 17 is a perspective view of still another embodiment of the rings and of the tightness stripe.

FIG. 17 shows another particular embodiment of the invention. The tightness stripe 8 comprises an elongated portion 8' on which no steps are formed and which carries pairs of blades 9 connected to the elongated portion 8' by means of the parts 10, 10, provided with bosses on the rear side of the staples. It is understood that in this embodiment, the rings themselves, in this case closed rings, and the parts 10, 10 of the blades formed with bosses are in abutment against the front part of the end of the conveyor belt, when tile staple is fixed on the said end. The attachment of the tightness stripe is ensured in this case by welding the elongated portion 8' against the rear internal part of the rings 3.

Figure 18:
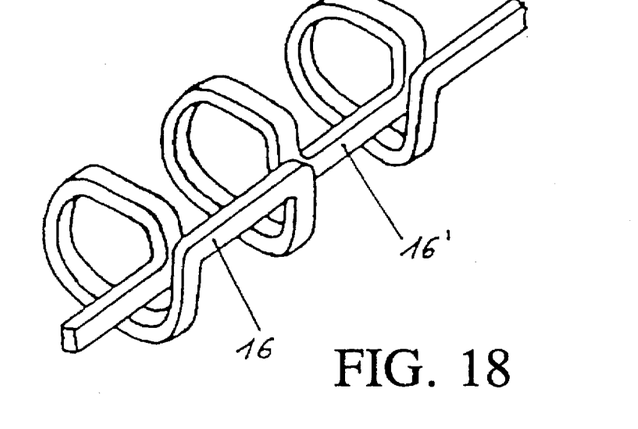
FIG. 18 is a perspective view of the winding type rings connected together.

FIG. 18 is a particular embodiment of the broken rings, connected together by linking parts 16 and 16' generally parallel to the median plane of the chain of rings 3, which passes through the largest dimension of the rings 3.

Figure 19:
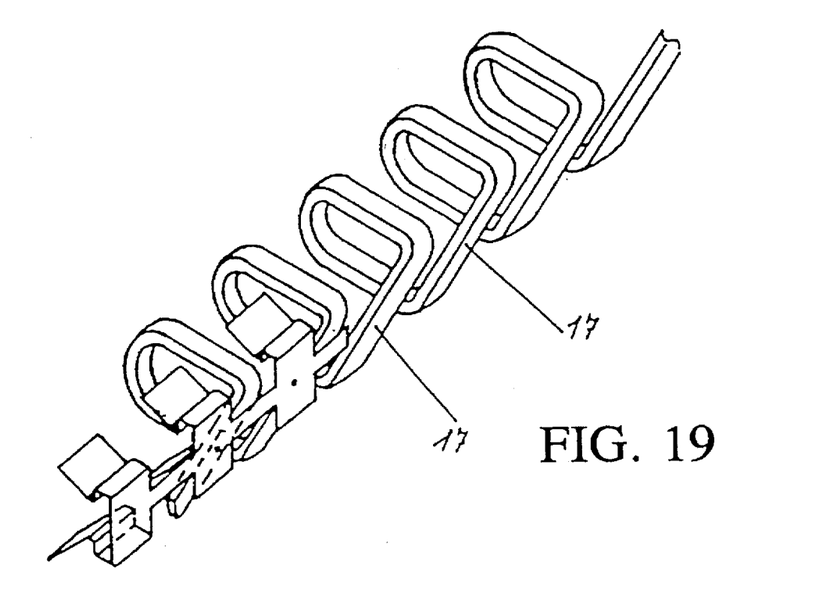
FIG. 19 is a perspective view of the helical type rings connected together, partially provided with a tightness stripe.

FIG. 19 shows rings connected together by the skewed linking parts 17, the attachment of the tightness stripe being carried out by welding against the rear face of the skewed linking parts 17.

It is to be noted that in order to obtain an improved picture the rings have been represented on certain views spaced apart by a distance longer than the actual one. FIG. 5 gives a clear picture of the arrangement and spacing of the staples in their actual position, and therefore enables to imagine the arrangement and spacing of the rings incorporated therein, but not shown on the Figure.

I claim:

1. A joining device for conveyor belt comprising two rows of generally U-shaped staples adapted to be fixed on the edge of each end of a conveyor belt (13) by means of pointed head nails (6), a convex part of the U-shaped staples (1) projecting beyond the edges forming each end of the conveyor belt, a concave part for the U-shaped staples (1) forming a succession of eyelets bounded by the said concave part of the staples and by the edge of the end of the conveyor belt to which the staples are adapted to be fixed, the staples of a first row of the two rows being placed between the staples of the second row of the two rows, in such a way that the eyelets of the staples of each of the two rows are in alignment in the transversal direction of the belt, a metallic rod (15) which forms a linking and hinging axis being threaded across these aligned eyelets, wherein a ring (3) is fixed to the concave part of each one of the U-shaped staples, the metallic rod (15) being threaded across each said ring of successive rings belonging alternately to the first row and to the second row of said two rows of staples (1).

2. The device according to claim 1, wherein the concave part of the staple (1) has a profile complementary to that of the external periphery of the ring (3).

3. The joining device according to claim 1, wherein the profile of the periphery of the ring (3) is flat, the concave part of the U-shaped staple (1) having a profile formed by a flat median part and by two parts forming raised rims oriented towards an internal part of a concavity which frame the ring.

4. The joining device according to claim 1, wherein the profile of the periphery of the ring (3) comprises at least one recess in the peripheral direction, the concave part of the U-shaped staple (1) having a profile comprising at least one ribbed part in the peripheral direction, of a shape complementary to that of at least one recess of the ring periphery.

5. The joining device according to claim 1, wherein the profile of the periphery of the ring (3) comprises several ribbed parts in the peripheral direction, the concave part of the U-shaped staple (1) having a profiled comprising several recesses in the peripheral direction, of a shape complementary to that of the ribbed parts of the ring (3) periphery.

6. The joining device according to claim 1, wherein the ring (3) is a broken ring.

7. The joining device according to claim 1, wherein the ring (3) is a broken ring, the broken ring being formed in such a way that ends of the broken ring overlap over a certain distance.

8. The joining device according to claim 1, wherein the rings (3) are formed by a chain of rings (3) incompletely closed connected together by linking parts (17) skewed with respect to the median plane of the chain of rings (3) passing through the largest internal dimension of the rings, the skewed linking parts (17) reaching forward to the next incompletely closed ring (3), the spacing between the successive rings (3) corresponding to the spacing required for the fitting of the staples (1) on the end of the conveyor belt.

9. The joining device according to claim 1, wherein the rings (3) are formed by a ring chain of incompletely closed rings (3) connected together by linking parts (16, 16') generally parallel to the median plane of the ring chain (3) passing through the largest dimension of the rings (3), the coiling direction of the incompletely closed rings (3) being reversed for each ring of the ring chain (3) with respect to the coiling direction of a preceding ring, the linking parts generally parallel to the median longitudinal plane of the ring chain being located alternately closer to the ring (3) center.

10. The joining device according to claim 1, wherein the successive rings (3) are fixed by being pinched inside the concave part of the staples (1) between the raised rims oriented towards the internal part of the concavity.

11. The joining device according to claim 1, wherein each ring (3) is welded on one or several points to the concave part of the staple (1) in which the ring (3) is located.

12. The joining device according to claim 1, wherein the successive rings (3) have an elongated shape wherein each ring (3) comprises a front half-circle and a rear half-circle, linked at their upper ends and at their lower ends by rectilinear parts or by curved parts presenting a slight concavity directed towards an internal part of the ring.

13. The joining device according to claim 1, wherein the ring (3) are interlocked in the concave part of the staple (1), the concave part of the staples (1) having a shape extending over slightly more than 180°, the ring (3) presenting a corresponding male form adapted for enabling the further fixation of the staples (1) against the end of the conveyor belt (13).

14. The joining device according to claim 1, wherein the resistance to friction wear of a material from which the ring (3) is made is higher than that of a material from which the U-shaped staples (1) are made.

15. The joining device according to claim 1, wherein slipping properties of the material from which the ring (3) is made higher than that of a material from which the U-shaped staples (1) are made.

16. The joining device according to claim 1, wherein the resistance to friction wear and the slipping properties of a material from which the ring (3) is made are higher than those of a material from which the U-shaped staples (1) are made.

17. The joining device according to claim 1, wherein a tightness stripe (8) is fixed to a rear part each of the ring (3) of the successive rings, the said tightness stripe (8) comprising an elongated portion (8') made of a flat resilient material by cutting and forming or by thermosetting and cutting, the profile of which corresponds generally to a curve of the rear part of the ring (3) on which said tightness stripe is to be fixed, as well as tightness blades (9) attached to said elongated portion (8') forming a single unit with said elongated portion, the surface and the spacing of these blades corresponding respectively to the surface and the spacing of upper parts and of lower parts of gaps which are present between the convex part of the staples (1) belonging to one row, and the opposed end of the conveyor belt (13), and between the staples (1) belonging to the other row fixed to said opposed end, when the junction is completed, the said blades (9) being arranged perpendicularly to the elongated portion (8').

18. The joining device according to claim 17, wherein the blades (9) are arranged according to one single row, on the side of the tightness stripe (8) which once mounted is oriented towards the end of the conveyor belt (13).

19. The joining device according to claim 17, wherein the blades (9) are arranged according to two rows, symmetrical with respect to a longitudinal symmetry plane dividing the elongated portion (8') of the tightness stripe (8).

20. The joining device according to claim 17, wherein the elongated portion (8') of the tightness stripe presents a series of steps (8") mutually spaced by a distance corresponding to the spacing of the successive rings (3) when the staples (10) are adapted to be mounted on the end of the conveyor belt (13), the said steps being oriented in the same direction as that of the tightness blades (9) and having an amplitude corresponding to the thickness of the ring (3), the tightness blades (9) being in that case attached to the elongated portion (8') of the tightness stripe (8) by a curved portion projecting rearward from the elongated portion (8') of the tightness stripe, by a distance, at least equal to the thickness of the ring.

21. The joining device according to claim 17, wherein the tightness stripe (8) is fixed to the ring (3) by a welding carried out against the rear part of the ring (3), successive tightness blades (9) being centered between the successive rings.

22. The joining device according to claim 17, wherein the tightness stripe (8) is fixed to the successive rings (3) of the tightness stripe, successive steps (8") being pinched between the overlapping ends (11, 11') of the successive rings.

23. The joining device according to claim 22, wherein the successive steps of the tightness stripe which are pinched between the overlapping ends (11, 11') of the successive rings (3) are furthermore welded to these latter.

24. The joining device according to claim 20, wherein the tightness stripe (8) is fixed to the successive rings (3), which are connected together, the successive steps (8") being pinched between the overlapping ends of successive linking parts.

25. The joining device according to claim 24, wherein the successive steps (8") of the tightness stripe (8) are pinched between the overlapping ends of the successive linking parts (16, 16') of winding type rings which are linked together, and are furthermore welded to these latter.

26. The joining devices according to claim 17, wherein the tightness stripe (8) is fixed by welding against a rear face of a skewed linking portion (17) connecting successive rings, flush with pairs of upper and lower blades (9).

27. The joining device according to claim 26, characterized by the fact that at least one of lugs of the staples (1) comprises on its lower surface oriented towards the conveyor belt, ribs (5") the general direction of which is skewed with respect to the longitudinal direction of the lugs of the staples and to the longitudinal direction of the conveyor belt, when the staples are adapted to be fixed to the end of the conveyor belt.

28. The joining device according to the claim 27, characterized by the fact that the ribs (5") are made up by of crossing extensions, the ribs (5") corresponding to longitudinal grooves in which are received the pointed head nails (6).

29. The joining device according to claim 1, characterized by the fact that the staple (1) rows are adapted to be mounted on the ends of the conveyor belt (13) in such a way as the rear parts of the rings (3) of each staple row are adapted to be in abutment against the front part (14) of the conveyor belt (13) on which it is mounted.

* * * * *